(12) United States Patent
Dumitrescu et al.

(10) Patent No.: US 9,329,808 B2
(45) Date of Patent: May 3, 2016

(54) USER INTERFACES FOR RULE-BASED WORKFLOW GENERATION IN A PRINT SHOP ENVIRONMENT

(75) Inventors: Tiberiu Dumitrescu, Simi Valley, CA (US); Daniel Hufnagel, Williamson, NY (US); Michael Raines, Austin, TX (US)

(73) Assignee: Ricoh Company, Ltd., Tokyo (JP)

( * ) Notice: Subject to any disclaimer, the term of this patent is extended or adjusted under 35 U.S.C. 154(b) by 278 days.

(21) Appl. No.: 13/070,732

(22) Filed: Mar. 24, 2011

(65) Prior Publication Data

US 2012/0243028 A1  Sep. 27, 2012

(51) Int. Cl.
*G06Q 10/00* (2012.01)
*G06F 3/12* (2006.01)

(52) U.S. Cl.
CPC ............ *G06F 3/1204* (2013.01); *G06F 3/1275* (2013.01)

(58) Field of Classification Search
CPC .......................... G06Q 10/06; G06Q 10/06316
USPC ....................................................... 358/1.15
See application file for complete search history.

(56) References Cited

U.S. PATENT DOCUMENTS

| | | | |
|---|---|---|---|
| 6,509,974 B1 * | 1/2003 | Hansen | 358/1.12 |
| 6,573,910 B1 | 6/2003 | Duke et al. | |
| 6,825,943 B1 | 11/2004 | Barry et al. | |
| 7,051,328 B2 | 5/2006 | Rai et al. | |
| 7,065,567 B1 | 6/2006 | Squires et al. | |
| 7,079,266 B1 | 7/2006 | Rai et al. | |
| 7,099,027 B1 | 8/2006 | Barry et al. | |
| 7,125,179 B1 | 10/2006 | Rai et al. | |
| 7,148,985 B2 | 12/2006 | Christodoulou et al. | |
| 7,558,638 B2 | 7/2009 | Chang et al. | |
| 7,589,851 B2 * | 9/2009 | De Bie et al. | 358/1.15 |
| 7,626,717 B2 | 12/2009 | Rai et al. | |
| 7,707,153 B1 * | 4/2010 | Petito et al. | 707/999.101 |
| 8,120,801 B2 | 2/2012 | Zhang et al. | |
| 8,259,321 B2 | 9/2012 | Zhang et al. | |
| 8,284,423 B2 | 10/2012 | Jahn et al. | |
| 8,427,670 B2 | 4/2013 | Rai | |
| 2002/0071134 A1 | 6/2002 | Jackson | |
| 2003/0041765 A1 | 3/2003 | Hill | |
| 2003/0061178 A1 | 3/2003 | Ogawa | |
| 2003/0177082 A1 | 9/2003 | Buckwalter | |
| 2003/0212611 A1 | 11/2003 | Barrot et al. | |
| 2004/0006522 A1 | 1/2004 | Keane | |
| 2004/0068424 A1 | 4/2004 | Lee et al. | |
| 2004/0111430 A1 | 6/2004 | Hertling | |
| 2004/0184061 A1 | 9/2004 | Christiansen | |

(Continued)

FOREIGN PATENT DOCUMENTS

| | | |
|---|---|---|
| EP | 1184779 A2 | 3/2002 |
| EP | 1320008 A2 | 6/2003 |

*Primary Examiner* — Thomas Lett
(74) *Attorney, Agent, or Firm* — Duft Bornsen & Fettig LLP

(57) ABSTRACT

Systems and methods are provided for user interfaces that aid a user in rule-based workflow generation. The system accesses activities available at a print shop, displays the available activities to a user at a sequence bar that sorts the activities by their priority, receives input from the user defining a rule that relates to a print shop activity, and stores the rule in a memory. Further, the system determines that a workflow of activities to perform has been generated for a print job of the print shop based upon the rule, wherein the workflow comprises an ordered subset of the activities available at the print shop, accesses the workflow, and displays the workflow of activities to the user.

20 Claims, 8 Drawing Sheets

(56) References Cited

U.S. PATENT DOCUMENTS

| | | |
|---|---|---|
| 2004/0196470 A1 | 10/2004 | Christiansen |
| 2004/0196493 A1 | 10/2004 | Christiansen |
| 2005/0065830 A1 | 3/2005 | Kuke et al. |
| 2005/0096770 A1 | 5/2005 | Chua et al. |
| 2005/0151993 A1 | 7/2005 | Gartstein |
| 2005/0154625 A1 | 7/2005 | Chua et al. |
| 2005/0248804 A1 | 11/2005 | Goel et al. |
| 2005/0275875 A1 | 12/2005 | Jennings, Jr. |
| 2006/0039026 A1 | 2/2006 | Lofthus et al. |
| 2006/0044597 A1 | 3/2006 | Dumitrescu et al. |
| 2006/0092467 A1 | 5/2006 | Dumitrescu et al. |
| 2006/0149755 A1 | 7/2006 | Marshall et al. |
| 2007/0070379 A1 | 3/2007 | Rai et al. |
| 2007/0091355 A1 | 4/2007 | Rai |
| 2007/0124182 A1 | 5/2007 | Rai |
| 2007/0177191 A1 | 8/2007 | Eschbach et al. |
| 2007/0185777 A1 | 8/2007 | Pyle et al. |
| 2007/0236708 A1 | 10/2007 | Jahn et al. |
| 2007/0242303 A1 | 10/2007 | Barry et al. |
| 2007/0247657 A1 | 10/2007 | Zhang et al. |
| 2007/0247659 A1 | 10/2007 | Zhang et al. |
| 2008/0137108 A1 | 6/2008 | Song et al. |
| 2008/0144080 A1 | 6/2008 | Randt |
| 2008/0180728 A1 | 7/2008 | Sekine |
| 2008/0256541 A1 | 10/2008 | Rai |
| 2008/0285067 A1 | 11/2008 | Rai |
| 2009/0043628 A1 | 2/2009 | Gombert |
| 2009/0063710 A1 | 3/2009 | Sekine et al. |
| 2009/0063718 A1 | 3/2009 | Sekine et al. |
| 2009/0109464 A1 | 4/2009 | Knodt |
| 2009/0244600 A1 | 10/2009 | Haycock |
| 2009/0251721 A1 | 10/2009 | Knodt et al. |
| 2009/0279123 A1 | 11/2009 | Sekine |
| 2009/0279124 A1 | 11/2009 | Liu et al. |
| 2009/0279125 A1 | 11/2009 | Liu et al. |
| 2009/0281862 A1 | 11/2009 | Conescu et al. |
| 2009/0282412 A1 | 11/2009 | Sekine et al. |
| 2010/0053657 A1 | 3/2010 | Weber |
| 2010/0060909 A1 | 3/2010 | Conescu et al. |
| 2010/0157371 A1* | 6/2010 | Miyata ............ 358/1.15 |
| 2010/0195140 A1 | 8/2010 | Shepherd |
| 2010/0231968 A1 | 9/2010 | Hirasawa |
| 2010/0250267 A1 | 9/2010 | Brenner et al. |
| 2011/0075195 A1* | 3/2011 | Cain ............... 358/1.15 |
| 2011/0090529 A1 | 4/2011 | Hertling |
| 2011/0170893 A1 | 7/2011 | Nishikawa |
| 2011/0199646 A1 | 8/2011 | Homma |
| 2012/0057191 A1* | 3/2012 | Gnanasambandam et al. ............ 358/1.15 |
| 2012/0092688 A1 | 4/2012 | Pangrazio |
| 2012/0188587 A1 | 7/2012 | Gaertner |
| 2012/0212771 A1 | 8/2012 | Goddard |

* cited by examiner

USER INTERFACES FOR RULE-BASED WORKFLOW GENERATION IN A PRINT SHOP ENVIRONMENT

RELATED APPLICATIONS

This application is related to commonly owned U.S. patent application Ser. No. 13/036,160, filed Feb. 28, 2011, entitled "WORKFLOW GENERATION IN A PRINT SHOP ENVIRONMENT" which is hereby incorporated by reference. This application is also related to commonly owned U.S. patent application Ser. No. 13/036,350, filed Feb. 28, 2011, entitled "JOB TICKET TRANSLATION IN A PRINT SHOP ARCHITECTURE" which is hereby incorporated by reference. This application is also related to commonly owned U.S. patent application Ser. No. 13/036,147, filed Feb. 28, 2011, entitled "WORKFLOW REGENERATION IN A PRINT SHOP ENVIRONMENT" which is hereby incorporated by reference. This application is also related to commonly owned U.S. patent application Ser. No. 13/036,379, filed Feb. 28, 2011, entitled "CUSTOMER-SPECIFIC SERVICES FOR JOB SUBMISSION IN A PRINT SHOP ARCHITECTURE" which is hereby incorporated by reference.

FIELD OF THE INVENTION

The invention relates to the field of print job management, and in particular, to user interfaces for workflow systems in a print shop environment.

BACKGROUND

Print shops are typically medium or large scale facilities capable of supplying printing services to meet a variety of customer demands. For example, print shops are often used to print documents for mass-mailing (e.g., customer bills, advertisements, etc.). Because print shops engage in printing on a scale that is hard to match, their customer base is usually varied. Print shop customers may therefore include both large institutional customers (e.g., credit card companies and banks), and small customers (e.g., small businesses and churches).

Print shops are generally arranged to print incoming jobs from customers in a way that is economical, yet fast. Thus, print shops often include a number of high-volume printers capable of printing incoming jobs quickly and at high quality. Print shops also typically include post-printing devices that are used to process the printed documents of each job (e.g., stackers, staplers, cutters, binders, etc.). Print shops may also provide digital/web publishing, e-mail, or other multimedia services to customers. Because print shops serve a variety of customers, they are often tasked with processing jobs that have varying printing formats, delivery dates, and media requirements. Print shops therefore often use a centralized print server that coordinates activity between printers and other devices of the print shop.

Customers submit their print jobs to print shops in a variety of formats. Along with the print data itself, a print job may include a job ticket describing what the customer wants (e.g., deliverable products, deadlines, e-mail blasts, etc.). For example, a customer may request that the print data be published at a web page and may further request to receive three copies of a printed document made from the print data. Customers may communicate their service requests to the print shop in different ways. For example, a customer may use a Web-to-Print application that generates an XML or JDF file for the print shop, or a customer may simply telephone a print shop operator to request print shop services.

As jobs are received at a print shop from different customers, each job ticket may include different services requested by a customer. To perform services requested by customers, a print shop performs a set of print shop activities. For example, to print a bound document, a print shop may engage in activities such as "pre-flight" review of print data, printing the document, post-print binding the document, physically shipping the document to the customer, and billing the customer. A customer's requested services can vary with each incoming job, and print shop devices and personnel perform different activities to process incoming jobs having different requested services. However, deciding the specific activities to perform for incoming print data is often a time consuming process, and print shop operators desire ways to more quickly and easily generate an ordered set of discrete activities that a print shop may perform for incoming print jobs to meet the demands of customers.

SUMMARY

Embodiments described herein address the concerns of print shop operators by providing user interfaces used to define rules for activities of the print shop. The user interface presents a "sequence bar" that lists activities of the print shop, ordered by their default priority. Rules are generated for the activities in the sequence bar, and these rules are used to generate ordered sets of print shop activities for incoming print jobs, known as workflows. Rules for creating workflows enable a print shop to dynamically create "custom" workflows for each incoming job that are tailored to the properties of the print job. Rules may define the priority, resources, and the dependency of activities within a print shop. For example, rules may add an activity to a workflow based upon the identity of a customer that submitted the print job. Thus, when a customer submits a print job to the print shop, a workflow of activities is generated that is tailored to the print job, based upon the rules defined by the print operator at the user interface.

One embodiment is a system comprising a memory and a graphical user interface (GUI). The memory stores activities available at a print shop. The GUI accesses the available activities, displays the available activities to a user, receives input from the user defining a rule for a customer that relates to a print shop activity, and stores the rule in the memory. Further, the GUI determines that a workflow of activities has been generated for a print job of the print shop based upon the rule, wherein the workflow comprises an ordered subset of the activities available at the print shop, accesses the workflow, and displays the workflow of activities to the user.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
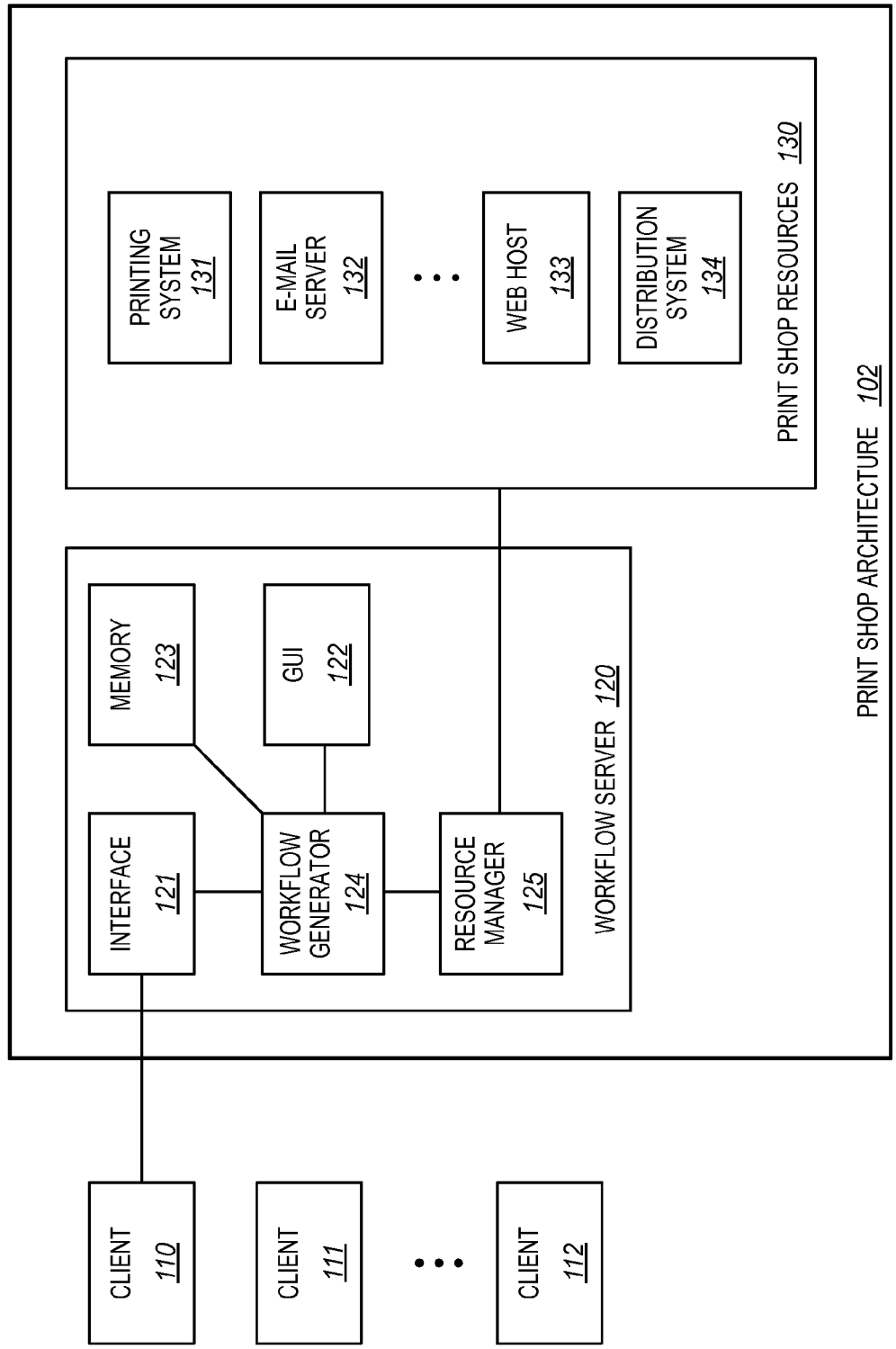
FIG. 1 is a block diagram illustrating a print shop architecture in an exemplary embodiment.

FIG. 1 is a block diagram illustrating a print shop architecture 102 in an exemplary embodiment. Print shop architecture 102 includes workflow server 120, which functionally connects one or more clients 110-112 to print shop resources 130. Clients 110-112 may be servers or software applications used by print shop customers. Clients 110-112 submit print data and job tickets that describe how the print data will be processed to interface 121. Workflow server 120 generates custom workflows for incoming print jobs, and manages print shop resources 130 in accordance with these workflows. The custom workflows are generated based on rules for the print shop, a job ticket of the print job, and activities available at the print shop.

Clients 110-112 may serve banks, credit card companies, or other customers having printing and document delivery needs (e.g., monthly bank statements, monthly credit card bills, etc.). Clients 110-112 may also serve customers with digital printing and publishing needs (e.g., needs for e-mail services, web publishing services, and others). Information describing the services requested by the customer may be included in job tickets sent by clients 110-112.

Print shop resources 130 include the devices and components of the print shop that are used to perform print shop activities. For example, print shop resources 130 may include personnel, printers, post-printing machinery, e-mail or web publishing servers, media, ink, firmware versions for print shop devices, and others. Print shop resources 130 may exist within the confines of the print shop itself, or may comprise off-site devices and functional components managed by workflow server 120. The print shop resources 131-134 illustrated in FIG. 1 are merely meant to provide an example of the variety of print shop resources 130 that may be provided. For example, print shop resources 130 may include printing system 131 for transforming print data onto a suitable printable medium, such as paper. Other resources may include e-mail server 132 for generating e-mails, web host 133 for generating and hosting web pages or other internet content, and distribution system 134 for packaging and shipping printed documents.

While in operation, workflow server 120 identifies available activities that may be performed by print shop resources 130. Workflow server 120 may determine available print shop activities based upon the nature of print shop resources 130. For example, when print shop resources 130 include e-mail server 132, available activities may include generating e-mails, scheduling times to send e-mails, and selecting e-mail recipients. Activities may be associated with a category or type of resource (e.g., personnel, printers, servers) and may also be associated with specific named print shop resources (e.g., Susan, printing system 131, e-mail server 132).

Innumerable print shop activities may be defined, and certain print shop activities may be logically related with each other so that they have order and dependency relationships (e.g., a post-printing activity such as hole punching may depend upon the print data being successfully printed). A print shop operator may prioritize activities (e.g., to ensure that billing is the last activity performed), and may make certain activities required (e.g., billing may be required for every print job that enters the system). Furthermore, certain activities may be required, altered, or made optional based upon specific clients, customers, or information in a job ticket of the print job (e.g., customer service requests, multimedia parameters, size of the print data, format of the print data, etc.). For example, thank-you letters may be sent to high value or long-term customers, while credit checks may be performed upon new customers. The logical relationships of print shop activities are hereinafter referred to as "print shop rules" or "rules." In addition to printing activities, rules may regulate non-printing activities (e.g., billing, shipping, document review, multimedia/digital/internet activities, credit checks, etc.). In order to aid an operator of the print shop in managing rules and activities, a Graphical User Interface (GUI) 122 is provided for generation and manipulation of activities and rules. Workflow server 120 stores rules for the print shop in memory 123.

Once rules and activities have been defined, workflow generator 124 is operable to generate a workflow for a print job of a customer. Workflow generator 124 generates the workflow based on information in a job ticket of the print job (e.g., customer service requests for printing or multimedia activities, the size of a print job, etc.) and the rules (e.g., the rules for the customer). The available activities are dynamically scheduled into the customized workflow to define an ordered set of activities to perform (including, for example, activities that run in parallel).

To aid workflow generator 124 in dynamically scheduling activities in the workflow, print shop activities may be associated with information that describes their resources, dependencies, and priorities. Rules may alter the dependency, priority, and resource information for print shop activities under specific conditions. Resource information describes the resources used for a specific activity. Dependency information describes activities that are performed before the current activity. Priority information describes where the activity would be placed in the second workflow if no dependency relationships existed between activities. Workflow generator 124 positions related activities in the second workflow based upon their resource usage, dependencies, and priority.

Resource manager 125 of workflow server 120 analyzes the generated workflow and directs print shop resources 130 to perform the activities defined by the workflow for a given print job. In one embodiment, resource manager 125 identifies activities that relate to specific print shop resources 131-134 (e.g., the activity "e-mail the client a printing status report" may relate to e-mail server 132), and instructs the specific resources to perform the identified activities. Resource manager 125 may further receive feedback from print shop resources 130 (e.g., information indicating that an activity has successfully completed).

Thus, while in operation, workflow server 120 receives and processes incoming print jobs from clients 110-112. Workflow server 120 determines the customer's service requests, and dynamically generates (i.e., "from scratch") a workflow of activities to perform in order to achieve the requested services for the customer while complying with the rules of the print shop. These dynamically generated workflows are customized to each incoming job based upon rules defined for the print shop. Workflow server 120 then initiates processing of the workflow for each job with print shop resources 130.

Further details of the operation of print shop architecture 102 will be discussed with regard to FIG. 2. Assume, for this embodiment, that a user (e.g., a print operator) wishes to establish a set of rules that may be used to direct workflow generator 124 in selecting and ordering print shop activities into workflows for incoming print jobs. The user therefore initiates the rule generation process by activating GUI 122 of workflow server 120.

Figure 2:
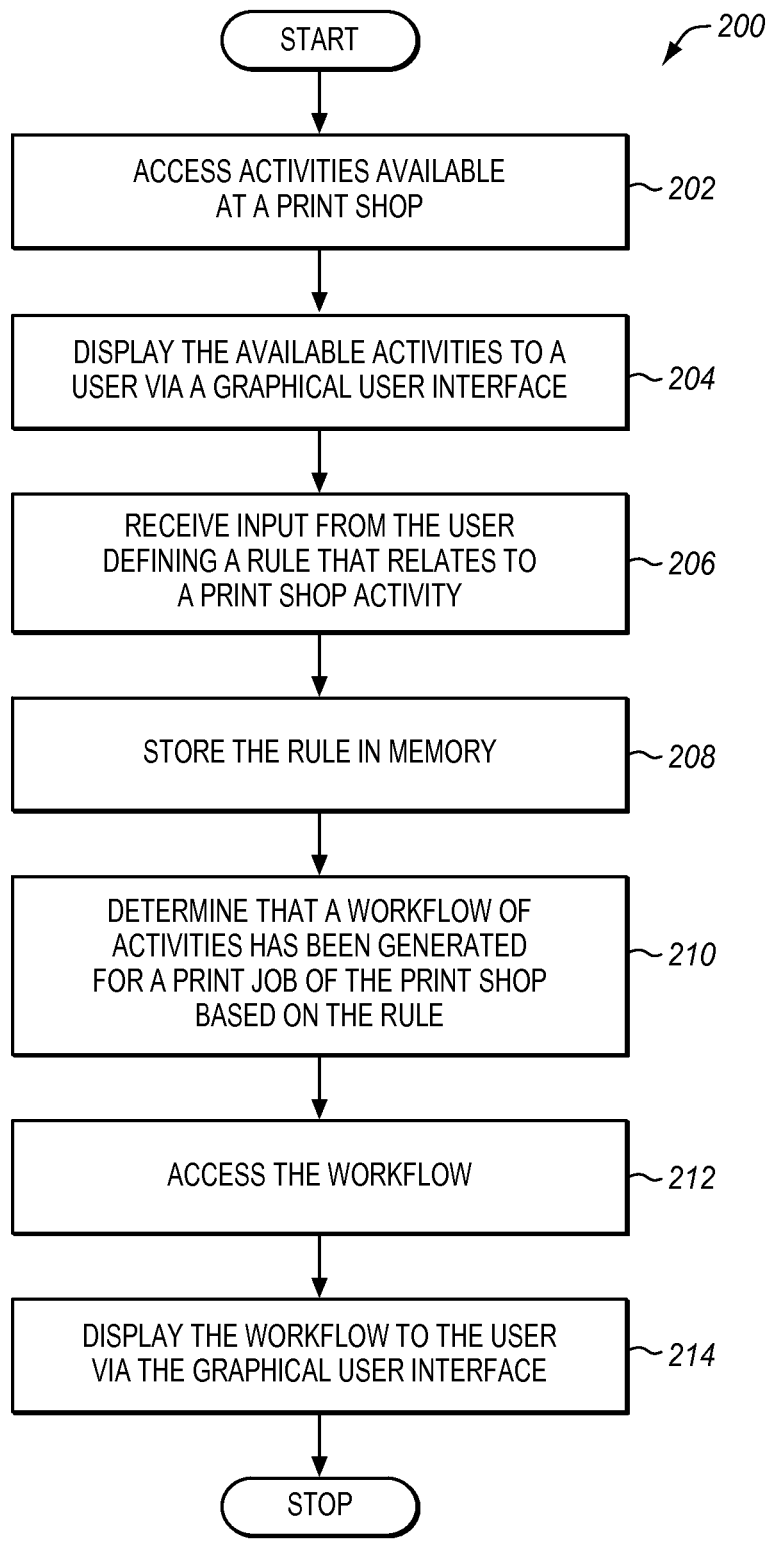
FIG. 2 is a flowchart illustrating a method for rule generation in an exemplary embodiment.

FIG. 2 is a flowchart illustrating a method 200 for rule generation in an exemplary embodiment. The steps of method 200 are described with reference to print shop architecture 102 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, GUI 122 initializes by accessing activities available at a print shop. Print shop resources 130 may automatically indicate their status (e.g., "online," "busy," "offline") and capabilities (e.g., e-mail, print, bind) to workflow server 120 as a set of JDF device capabilities, and workflow server 120 may associate available activities stored in memory 123 with print shop resources 130 based upon those capabilities. Furthermore, each activity may be associated with a specific capability of a print shop resource 131-134.

In step 204, GUI 122 displays the available activities to a user. Available activities may be displayed in a dialogue window of GUI 122, and may be sorted or filtered in any manner that makes the activities accessible to the user. For example, GUI 122 may sort activities available in the print shop based upon priority, dependency, resources used, etc. When activities are sorted by priority, GUI 122 may display the activities in a window such as sequence bar 310, depicted with regard to FIG. 3, described below. By displaying a "default order" describing the typical sequence of activities, GUI 122 helps a user to understand the general relationships between print shop activities at the print shop. When a user selects an activity from GUI 122, the user may further calibrate the activity (e.g., alter the type of ink used in a printing activity, etc.).

It is important to note that at this time, the activities displayed by GUI 122 are not currently arranged in a workflow for a specific print job, but rather simply represent a set of available activities at the print shop. Thus, in step 204, GUI 122 does not display workflow templates. When manipulating the activities displayed via GUI 122, a user does not manipulate a specific workflow for a print job, but rather changes the way that activities are combined by workflow generator 124 in order to generate workflows for print jobs. Thus, GUI 122 provides a substantially different interface than that provided by conventional template-based workflow systems.

Figure 5:
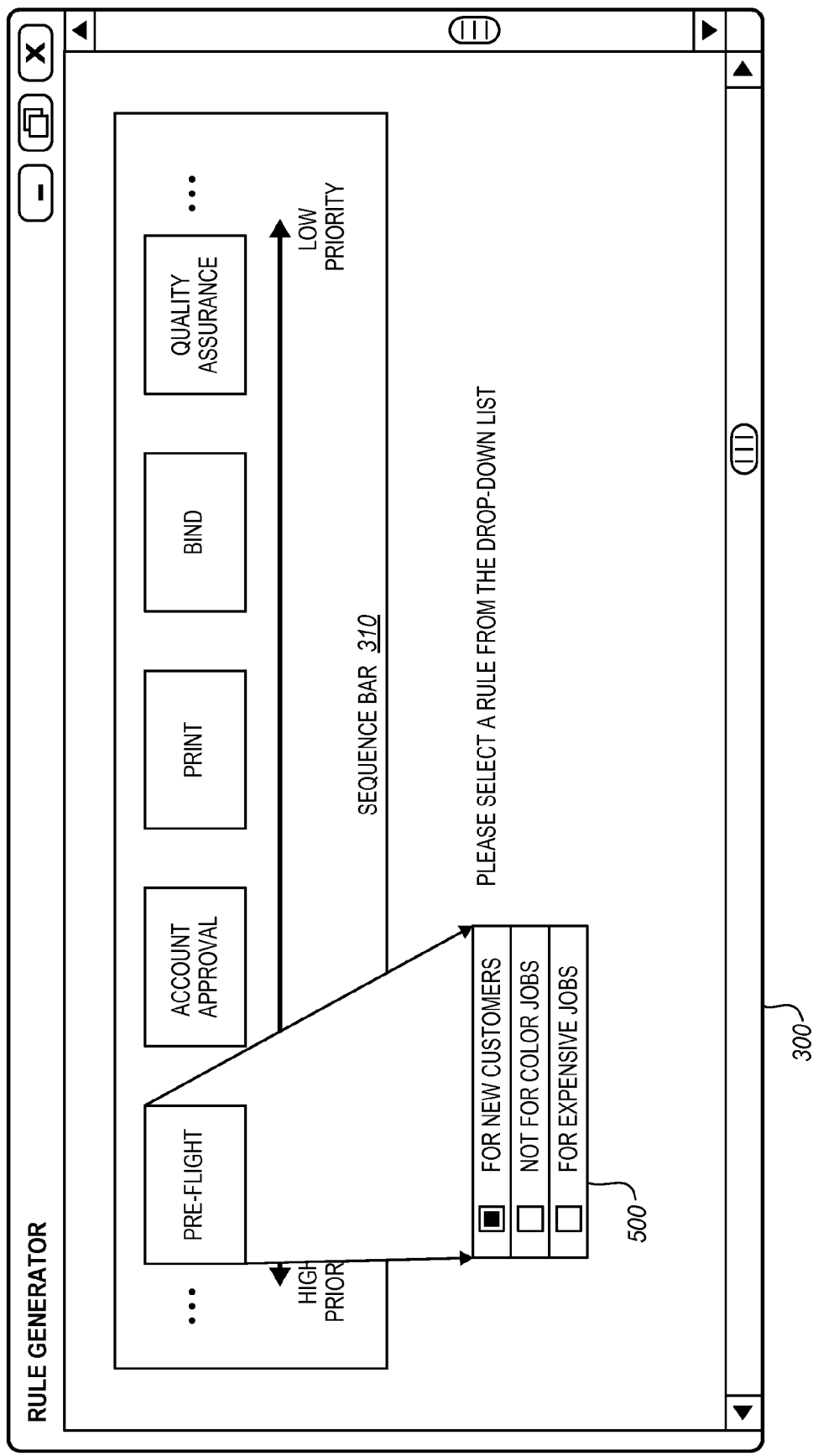
FIG. 5 is a block diagram of a user interface for generating print shop rules in an exemplary embodiment.
Figure 6:
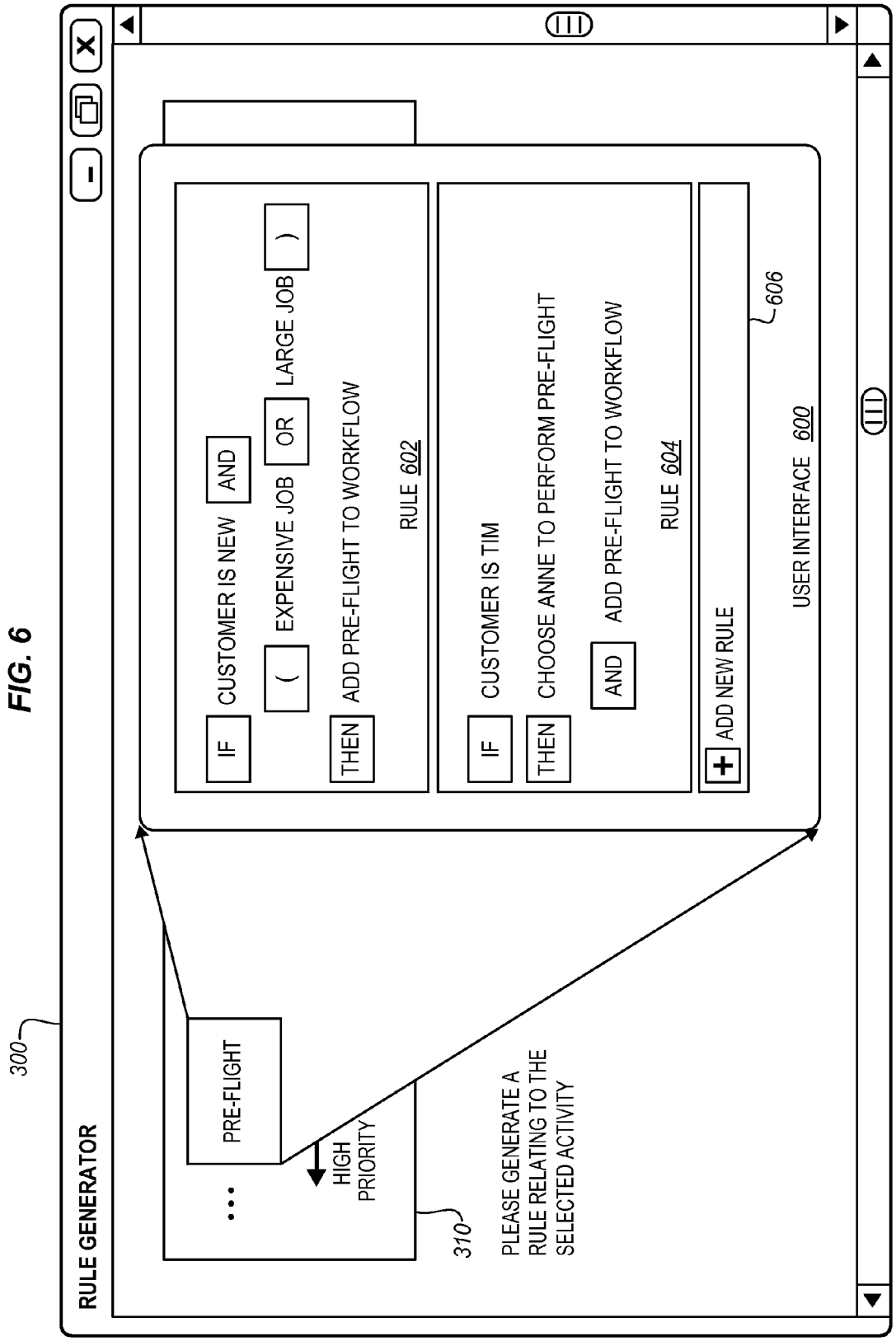
FIG. 6 is a block diagram of another user interface for generating print shop rules in an exemplary embodiment.

In step 206, workflow server 120 receives input via GUI 122 defining rules that relate to print shop activities (e.g., a rule defined for a customer, such as a rule that adds an activity to the workflow whenever a customer is identified as the source of a print job). GUI 122 may provide a dialogue to the user to help the user define a rule (as shown in FIG. 6, described below), may provide a list of rules for the user to activate (as shown in FIG. 5, described below), or may otherwise facilitate rulemaking by providing an interactive menu used to define a rule. Thus, user input may include a user selecting a button for a specific rule, or may include a series of logical operators and conditions that are parsed by GUI 122 in order to generate a rule (e.g., GUI 122 may analyze user input that exists in a procedural language such as a proprietary language, C, C++, Java, etc. in order to generate a rule).

In step 208, GUI 122 stores the rule in memory 123 for later processing. Based on the input from the user, workflow server 120 may convert the rule into a format that is understood by workflow generator 124. Thus, rules defined by the user may be accessed by workflow generator 124 when generating a workflow for a print job. Before storing the rule in memory 123, GUI 122 may associate the rule with tags or other metadata that describe the rule (e.g., the tag may indicate the user who created the rule, the date the rule was created, the activity or customer that the rule relates to, etc.). This in turn allows print operators to quickly retrieve sets of related rules in the print shop.

In certain circumstances, a user may desire to alter the way the print shop processes incoming print jobs, but may not wish to delete the existing set of print shop rules. For example, the print shop may temporarily experience a change in the availability of print shop resources 130, such as when a printer in the print shop is undergoing a lengthy maintenance procedure. Here, a user wishes to temporarily create a new set of print shop rules to address the change at the print shop, and then to revert back to the original set of print shop rules. To aid a print operator in this objective, GUI 122 may use the metadata associated with the rules to activate and de-activate entire groups of rules at a time. Thus, a print operator may be able to quickly make large changes to the way the print shop processes incoming jobs.

Once print shop rules are in place, workflow generator 124 may generate workflows customized for incoming print jobs based on the rules for the print job (e.g., the rules for the customer), the set of available activities, and a job ticket of the print job. Custom workflows are not merely assigned from a predefined workflow template, but rather are generated "from scratch" depending upon available activities at the print shop. For example, custom workflows may not even exist for a print job until after the print job is received at workflow server 120. The workflow comprises an ordered set of print shop activities, and is arranged to conform with the print shop rules (e.g., the rules defined for the customer). To determine an activity to place at a location in the workflow, workflow generator 124 filters the available activities based upon a job ticket of the print job and the rules for the print job. Information in a job ticket of the print job may include print data and multimedia characteristics (e.g., e-mail addresses, print data size, print data format, etc.), as well as services requested by the customer (e.g., three copies, in black and white, delivered in one week). In one embodiment, workflow generator 124 analyzes the services requested by the customer to generate selection criteria for the activities. The rules may also provide criteria for choosing from the set of available activities of the print shop. For example, a rule may require a credit check activity to be performed for new customers. Using the job ticket and the rules for the customer, the available activities can be placed at specific locations in order to generate a workflow.

In step 210, GUI 122 determines that a workflow of activities has been generated for a print job of the print shop based upon the rule defined by the user. The workflow comprises an ordered subset of the available activities and may be generated based upon the print shop rules, print job properties (e.g., job ticket information), and the available activities. GUI 122 may determine that a workflow has been generated by querying workflow generator 124, or may simply receive a notification from workflow generator 124 indicating that a workflow has been generated for an incoming print job.

Figure 7:
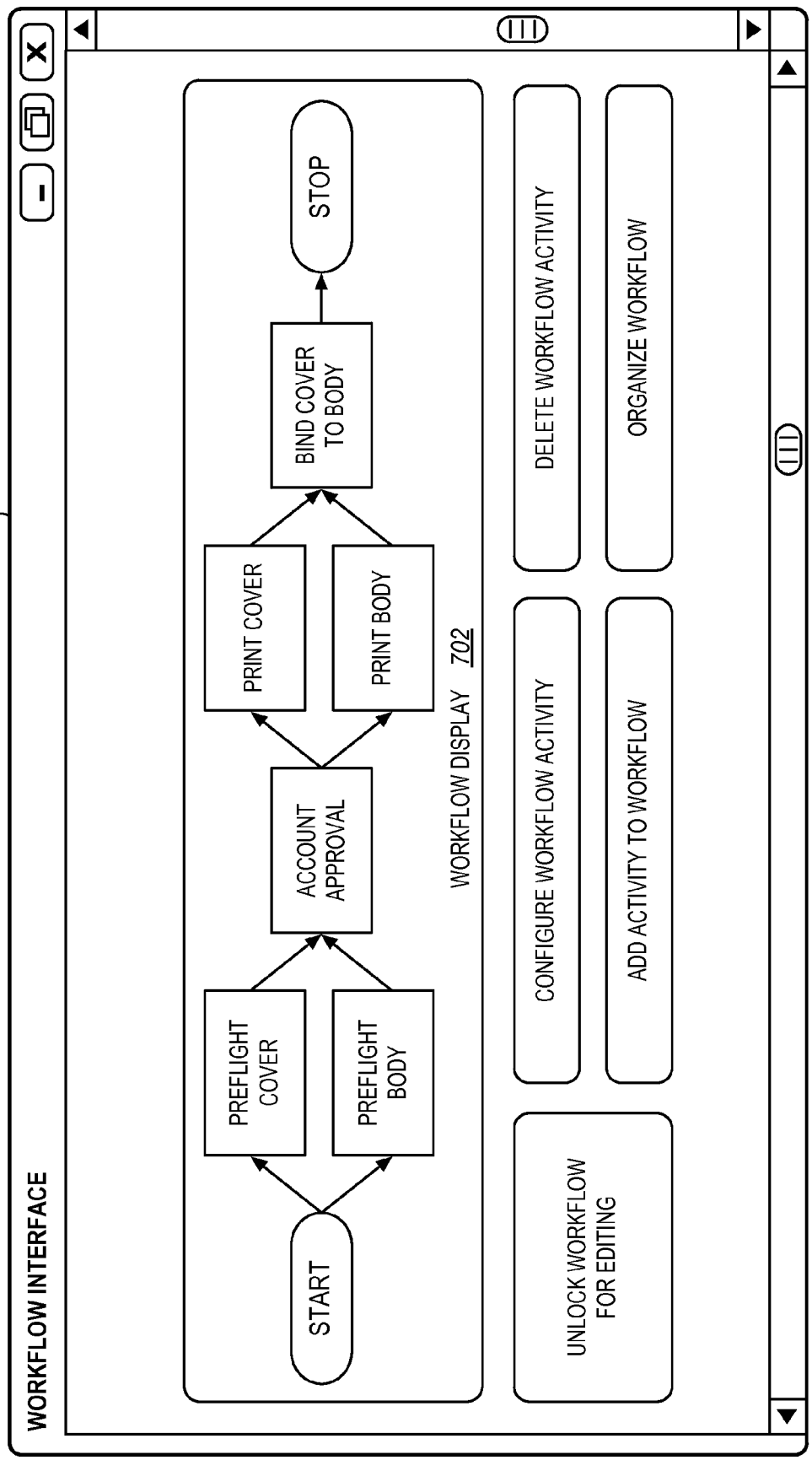
FIG. 7 is a block diagram of a workflow interface for viewing and altering workflows in an exemplary embodiment.

In step 212, GUI 122 accesses the workflow generated for the print job, and in step 214, GUI 122 displays the workflow to the user (as shown in FIG. 7, described below). The workflow may be displayed graphically (e.g., as a flowchart), or may be displayed as an ordered list of items or activities to perform. Furthermore, GUI 122 may indicate the current progress of the workflow to the user by indicating the tasks of the workflow that have not been completed, the tasks that have been completed, and the tasks that are currently in-progress.

Thus, method 200 provides a graphical user interface that allows a print operator to define rules for selecting and ordering activities of a print shop into custom workflows for incoming print jobs. At the same time, method 200 accomplishes this goal without resorting to special templates specifically tailored to each type of incoming print job. According to method 200, a print operator using GUI 122 need only to manage one master set of activities and rules for the print shop, thereby simplifying the workflow management process for incoming jobs. A workflow generator is then operable to use the rules, the available activities, and information in job tickets to generate different custom workflows for incoming jobs "from scratch."

EXAMPLES

In the following examples, additional processes, systems, and methods are described in the context of a GUI 122 for a workflow server that enables print operators to define rules for a print shop.

Figure 3:
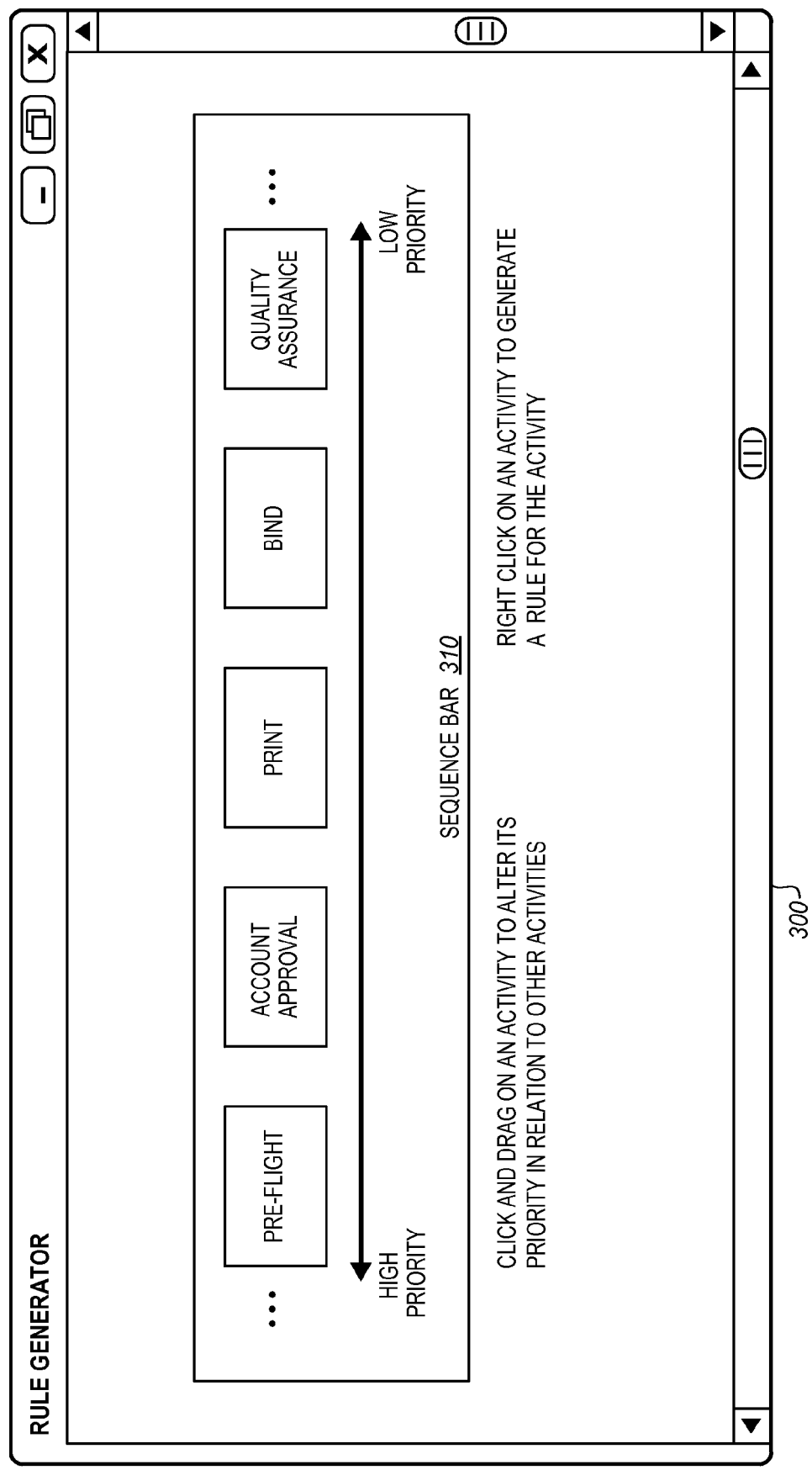
FIG. 3 is a block diagram illustrating a rule generator that displays activities of a print shop in an exemplary embodiment.

FIG. 3 is a block diagram illustrating a rule generator 300 that displays activities of a print shop in an exemplary embodiment. In this example, rule generator 300 is implemented at GUI 122, and displays available print shop activities, sorted by priority, at sequence bar 310. According to sequence bar 310, high priority activities may be placed to the left of lower priority activities. Here, it should be noted that sequence bar 310 is adapted to display all (or a filtered subset) of the available activities at the print shop. Thus, sequence bar 310 is not tied to a specific sequence of activities used in a workflow for a specific print job. Rather, when sequence bar 310 is altered by a print operator the changes "trickle through" in different ways to the workflows that will be generated for each incoming print job (depending on the rules, the nature of the print job, and the available activities). In this manner, a print operator may manipulate the general sequence of events that occur in a print shop as a print job is processed, even before the print operator knows the type of print job that will enter the print shop. Furthermore, the print operator does not need to worry about generating a template to use for each type of incoming print job, because workflow generator 124 will dynamically select and arrange the appropriate subset of activities into custom workflows for processing each incoming job. Sequence bar 310 supports a drag and drop interface that allows a user to change the priority of activities in relation to each other. Sequence bar 310 further supports the ability to change the priority or configuration of an activity via a dialogue box. In this embodiment, each activity is associated with a number indicating a priority, and activities with the highest number are given the highest priority (i.e., are performed earlier in a workflow unless a rule states otherwise). Multiple activities may have the same priority number, in which case they will be displayed "stacked" at the same horizontal location in sequence bar 310. In circumstances where activities that have the same priority are used in a workflow, print shop rules may be used to determine which activity to perform first (or may be used to determine whether the activities are run in parallel).

Figure 4:
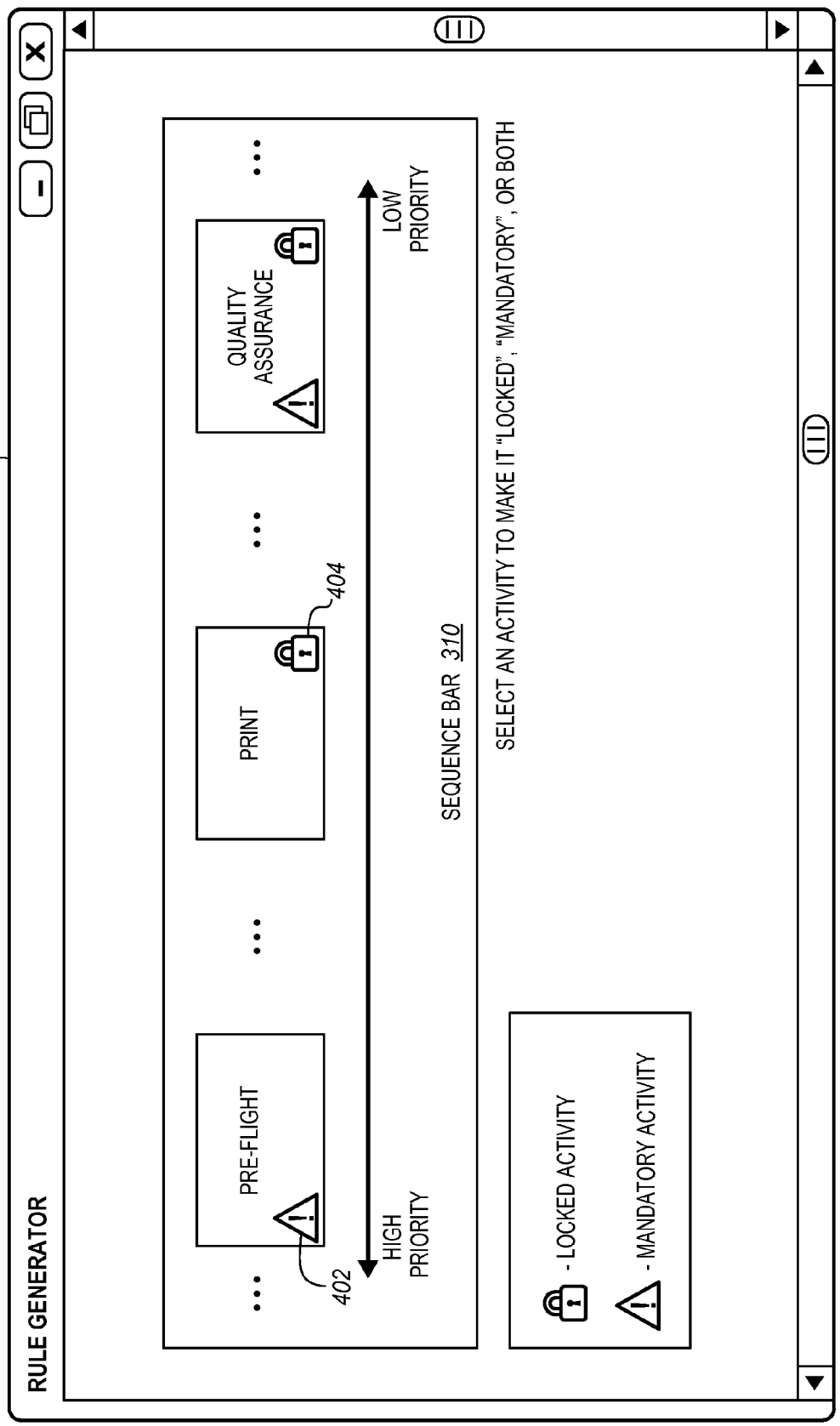
FIG. 4 is a block diagram illustrating further details of a rule generator in an exemplary embodiment.

FIG. 4 is a block diagram illustrating further details of a rule generator 300 in an exemplary embodiment. In this embodiment, activities in sequence bar 310 may be tagged by the user as mandatory with mandatory indicator 402, and activities may be tagged as locked with locked indicator 404. When activities are mandatory, they are added to the workflow for all incoming jobs, regardless of whether the job ticket of the incoming job requests the activity. This may be desired for activities such as customer credit checks, which would not normally be explicitly requested by a customer in a job ticket. Locked activities of sequence bar 310 are different than mandatory activities. When activities in sequence bar 310 are locked, their position relative to other activities in sequence bar 310 cannot be changed in workflows that use the locked activity. For example, the "print" activity is locked in FIG. 4, meaning that print may not occur before pre-flight in generated workflows, and may also not occur after quality assurance in generated workflows. While priorities typically are used to define the order of activities in a workflow, information in a job ticket may occasionally override priority information for an activity and may change the order of activities. Locking an activity ensures that its relative location in a generated workflow will not be altered by job ticket information. Thus, locked activities are always performed at the times desired by the print operator.

FIG. 5 is a block diagram of a user interface 500 for generating print shop rules in an exemplary embodiment. In this embodiment, user interface 500 is implemented via sequence bar 310 of rule generator 300. A user may activate user interface 500 by selecting (e.g., double-clicking on) an activity in sequence bar 310, at which time a predetermined list of print shop rules "pops up" next to the selected activity. A user may then select the rules that they wish to apply to the activity. For example, a user may activate a rule that adds the activity of "pre-flight" to each incoming print job from new customers, regardless of whether the print job specifically requests such an activity.

FIG. 6 is a block diagram of another user interface 600 for generating print shop rules in an exemplary embodiment. User interface 600 may also be activated via sequence bar 310 of rule generator 300. User interface 600 provides print operators with dialogue boxes having conditional language that may be used to generate specific rules dictating the actions that the print shop should take when certain conditions are met. This conditional language may be implemented by providing a set of logical operators to the print shop operator and providing a set of print shop conditions (i.e., conditions that can be detected by workflow server 120) used to trigger the rule. In one embodiment, the print shop conditions are provided based upon the configuration of the print shop (e.g., the type and configuration of print shop resources 130) or the customers that submit print jobs to the print shop (e.g., the sophistication of the customers in terms of printing expertise, the length of time the customer has been with the print shop, the volume of print jobs coming from the customers, etc.). For example, when the print shop includes a printer, the conditions could describe the status of the printer, the number of jobs or pages in the queue for the printer, the firmware version of the printer, the media or ink loaded at the printer, and others. Conditions and logical operators may be provided in a procedural language by a user and then interpreted by GUI 122. In one embodiment, conditions and logical operators are provided via drop-down menus or are drag-and-dropped into user interface 600 in order to arrange them into a logical rule. GUI 122 may be further operable to parse rules generated by a print operator to ensure that the rules can be processed by workflow server 120 or otherwise constitute a valid logical test/relationship. FIG. 6 displays two rules (rule 602 and rule 604) defined by a print operator. A print operator may also add further rules by selecting "add new rule" button 606.

FIG. 7 is a block diagram of a workflow interface 700 for viewing and altering workflows in an exemplary embodiment. In this embodiment, a generated workflow customized for a print job is displayed at workflow display 702. Here, the workflow comprises an ordered subset of the activities available via sequence bar 310 of FIG. 3, and includes activities that are performed in parallel. In this embodiment, in order to minimize the potential for human error, the workflow itself remains locked until the user selects the "unlock workflow for editing" button. This reduces the chances that the workflow will be unintentionally altered when it is viewed by the user. Once the workflow is unlocked for editing, a user may perform various activities such as configuring a specific workflow activity (e.g., altering the number of copies created during a "print" activity), adding an activity to the workflow, deleting an activity from the workflow, or otherwise organizing the workflow. These activities may be performed by selecting the button associated with each task (resulting in a new dialogue window for each activity), or may be performed by selecting, dragging and dropping, or cutting and pasting workflow activities as they are shown in workflow display 702. GUI 122 may then submit the requested changes to workflow generator 124, which generates a new workflow for the print job based upon the user's requests. Workflow generator 124 may be further operable to detect any potential errors or incompatibilities that occur when the workflow is re-arranged (e.g., arrangements with improper dependencies), to report these errors to the user via GUI 122, and to return the workflow to its original state or otherwise correct the error. Upon successful completion of the changes indicated by the user's request, GUI 122 is operable to display a confirmation to the user via workflow display 702 (e.g., to display a visually different workflow or other notification).

Figure 8:
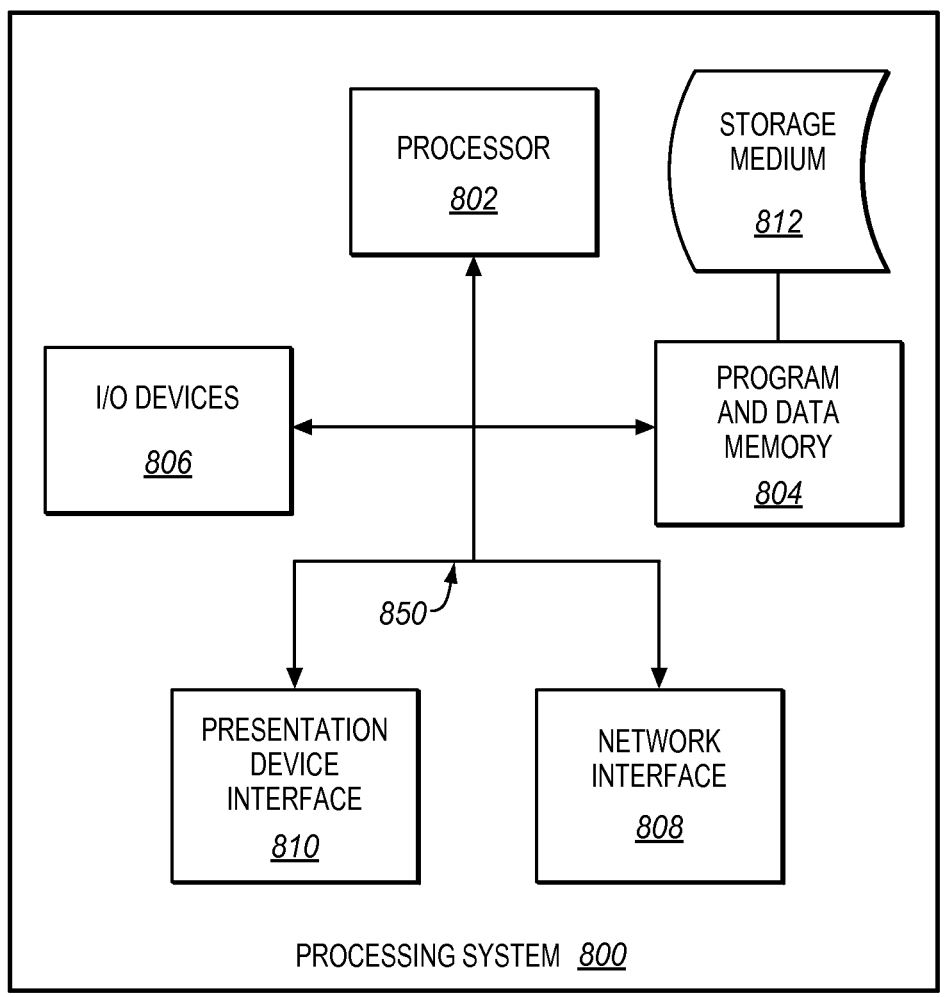
FIG. 8 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of workflow server 120 to perform the various operations disclosed herein. FIG. 8 illustrates a processing system operable to execute a computer readable medium embodying programmed instructions to perform desired functions in an exemplary embodiment. Processing system 800 is operable to perform the above operations by executing programmed instructions tangibly embodied on a computer readable storage medium 812. In this regard, embodiments of the invention can take the form of a computer program accessible via the computer-readable medium 812 providing program code for use by a computer or any other instruction execution system. For the purposes of this description, a computer readable storage medium 812 can be anything that can contain or store the program for use by the computer.

The computer readable storage medium 812 can be an electronic, magnetic, optical, electromagnetic, infrared, or semiconductor device. Examples of the computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 800, being suitable for storing and/or executing the program code, includes at least one processor 802 coupled to memory elements 804 through a system bus 850. The memory elements 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc) can be coupled to the system either directly or through intervening I/O controllers. Network adapter interfaces 808 may also be coupled to the system to enable the processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be coupled to the system to interface to one or more presentation devices, such as printing systems and displays for presentation of presentation data generated by processor 802.

Although specific embodiments were described herein, the scope of the invention is not limited to those specific embodiments. The scope of the invention is defined by the following claims and any equivalents thereof.

We claim:

1. A system comprising:
    a memory that stores activities available at a print shop architecture;
    a graphical user interface that accesses the activities, displays the activities to a user, receives input from the user defining a rule for a customer that describes a dependency relationship between the activities available at the print shop architecture, and stores the rule in the memory; and
    a workflow generator that dynamically arranges the activities to generate a new custom workflow of activities to perform for an incoming print job, based upon the rule,
    wherein the graphical user interface further determines that the new custom workflow of activities to perform has been generated by the workflow generator, and wherein the new custom workflow comprises an ordered subset of the activities available at the print shop architecture.

2. The system of claim 1, wherein
    the rule indicates that one activity is a prerequisite for successfully completing another activity.

3. The system of claim 1, wherein
    the rule defines whether an activity will be added to a custom workflow, based upon information in a job ticket for the print job.

4. The system of claim 1, wherein
    the rule alters an activity based on information in a job ticket for the print job.

5. The system of claim 3, wherein
the graphical user interface provides conditions that describe properties of the print job.

6. The system of claim 1, wherein
the graphical user interface further receives a second input from the user indicating a requested alteration to the new custom workflow, provides information describing the alteration to the workflow generator, receives a confirmation that the new custom workflow has been successfully altered, and displays the altered workflow to the user.

7. The system of claim 1, wherein
the rule is used to determine whether an activity is placed in custom workflows.

8. The system of claim 1, wherein
the rule influences the order of activities in custom workflows.

9. The system of claim 1, wherein
the new custom workflow is not based on a predefined template, and the new custom workflow does not exist until after the print shop architecture receives the print job.

10. A method comprising:
accessing a set of activities available at a print shop architecture;
displaying the activities to a user via a graphical user interface;
receiving input from the user, via the graphical user interface, that defines a rule for a customer that describes a dependency relationship between the activities available at the print shop architecture;
storing the rule in a memory;
dynamically arranging the activities to generate a new custom workflow of activities to perform for an incoming print job, based upon the rule;
determining that the new custom workflow of activities to perform has been generated, wherein the new custom workflow comprises an ordered subset of the activities available at the print shop architecture.

11. The method of claim 10, wherein
the rule indicates that one activity is a prerequisite for successfully completing another activity.

12. The method of claim 10, wherein
the rule defines whether an activity will be added to a custom workflow, based upon information in a job ticket for the print job.

13. The method of claim 10, wherein
the rule alters an activity based on information in a job ticket for the print job.

14. The method of claim 12, further comprising
providing, via the graphical user interface, conditions that describe properties of the print job.

15. The method of claim 10, further comprising
receiving a second input from the user indicating a requested alteration to the new custom workflow;
providing information describing the alteration to a workflow generator;
receiving a confirmation that the new custom workflow has been successfully altered; and
displaying the altered workflow to the user.

16. The method of claim 10, wherein
the rule is used to determine whether an activity is placed in custom workflows.

17. The method of claim 10, wherein
the rule influences the order of activities in custom workflows.

18. The method of claim 10, wherein
the new custom workflow is not based on a predefined template, and the new custom workflow does not exist until after the print shop architecture receives the print job.

19. A system comprising:
a memory that stores activities available at a print shop architecture;
a graphical user interface that accesses the activities, displays the activities to a user, receives input from the user defining a rule that describes a dependency relationship between activities at the print shop architecture, and stores the rule in the memory; and
a workflow generator that dynamically arranges the activities to generate a new custom workflow of activities to perform for an incoming print job, based upon the rule,
wherein the graphical user interface further determines that the new custom workflow of activities to perform has been generated by the workflow generator, and wherein the new custom workflow comprises an ordered subset of the activities available at the print shop architecture.

20. The system of claim 19, wherein
the rule indicates that one activity is a prerequisite for successfully completing another activity.

* * * * *